United States Patent
Brinkman et al.

(10) Patent No.: US 9,328,189 B2
(45) Date of Patent: May 3, 2016

(54) CURING OF AROMATIC CARBODIIMIDES

(71) Applicant: Rohm and Haas Company, Philadelphia, PA (US)

(72) Inventors: Larry F. Brinkman, Woodstock, IL (US); Bradley A. Jacobs, Crystal Lake, IL (US); Amira A. Marine, Missouri City, TX (US); David E. Vietti, Cary, IL (US); Joseph J. Zupancic, Glen Ellyn, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/431,811

(22) PCT Filed: Oct. 3, 2013

(86) PCT No.: PCT/US2013/063204
§ 371 (c)(1),
(2) Date: Mar. 27, 2015

(87) PCT Pub. No.: WO2014/058700
PCT Pub. Date: Apr. 17, 2014

(65) Prior Publication Data
US 2015/0240022 A1    Aug. 27, 2015

Related U.S. Application Data

(60) Provisional application No. 61/710,791, filed on Oct. 8, 2012.

(51) Int. Cl.
C08G 14/02    (2006.01)
C08G 18/02    (2006.01)
C08G 18/48    (2006.01)
C08G 18/76    (2006.01)
C08G 18/28    (2006.01)
C08L 79/00    (2006.01)
C08G 18/79    (2006.01)
C08G 18/10    (2006.01)
C08G 71/00    (2006.01)
C08G 16/04    (2006.01)

(52) U.S. Cl.
CPC .............. *C08G 18/025* (2013.01); *C08G 18/10* (2013.01); *C08G 18/282* (2013.01); *C08G 18/4829* (2013.01); *C08G 18/7671* (2013.01); *C08G 18/797* (2013.01); *C08G 71/00* (2013.01); *C08L 79/00* (2013.01)

(58) Field of Classification Search
CPC ................................ C08G 18/10; C08L 79/00
USPC ........................................................ 525/452
See application file for complete search history.

(56) References Cited

U.S. PATENT DOCUMENTS 5,357,021 A     10/1994  Tye et al.
2005/0245721 A1  11/2005  Beckley et al.

FOREIGN PATENT DOCUMENTS

EP    1967535      *  9/2008
EP    1967535 A1      9/2008
JP    56140354        2/1986

OTHER PUBLICATIONS

Robinson, "Polymerization of the Carbon—Nitrogen Double Bond in Carbodiimides", J. Poly. Sci, Part A., vol. 2, pp. 3901-3908 (1964).
Shibayama, et al., "Living Polymerization of Carbodiimides Initiated by Copper(I) and Copper(II) Amidinate Complexes", Macromolecules, vol. 30, pp. 3159-3163 (1997).
Kim, et al., "Lyotropic Liquid Crystalline Properties of Poly(N,N-di-n-hexylguanidine", Macromolecules, vol. 34, pp. 1660-1662 (2004).
Kennemur, et al., "Advances in Polycarbodiimide Chemistry", Polymer, vol. 52, pp. 1693-1710 (2011).
Tian, et al., "Helix-Sense Selective Polymerization of Carbodiimides: Building Permanently Optically Active Polymers from Achiral Monomers", J. Am. Chem. Soc., vol. 126, pp. 4082-4083 (2004).
Goodwin, et al., "Synthesis of New Rigid Rod Helical Polymers through the Living Polymerization of Carbodiimides Using Titanium (IV) Complexes", Macromolecules, vol. 27, pp. 5520-5522 (1994).

* cited by examiner

Primary Examiner — Terressa Boykin
(74) Attorney, Agent, or Firm — Kenneth Crimaldi

(57) ABSTRACT

A method for polymerizing an aromatic multi-functional carbodiimide by contacting the aromatic multi-functional carbodiimide with a carboxylic acid salt at a temperature from 15° C. to 90° C.

3 Claims, No Drawings

CURING OF AROMATIC CARBODIIMIDES

BACKGROUND

This invention relates generally to a method for curing aromatic carbodiimides at low temperatures.

Methods for curing aromatic carbodiimides are well known. For example, G. C. Robinson, *J. Poly. Sci, Part A.*, Vol. 2, 3901-3908 (1964) discloses polymerization of carbodiimides either by using moisture-sensitive organometallic catalysts or by heating to high temperatures.

However, there is a need for alternative methods for curing carbodiimides that are more commercially useful.

STATEMENT OF INVENTION

The present invention is directed to a method for polymerizing an aromatic multi-functional carbodiimide; said method comprising contacting the aromatic multi-functional carbodiimide with a carboxylic acid salt at a temperature from 15° C. to 90° C.

The present invention is further directed to a curable resin composition comprising a carbodiimide prepolymer and a carboxylic acid salt; wherein the carbodiimide prepolymer has two aromatic substituents adjacent to each carbodiimide group.

DETAILED DESCRIPTION

All percentages are weight percentages (wt %), and all temperatures are in ° C., unless otherwise indicated. Percentages of constituents of a polymer are on a solids basis, i.e., excluding solvents, unless otherwise indicated. "Multi-functional" means having more than one isocyanate or carbodiimide group per molecule or polymer chain. An "aromatic multi-functional carbodiimide" is any carbodiimide having an average carbodiimide functionality of at least 1.2 and having two aromatic substituents adjacent to each carbodiimide group, i.e., wherein each carbodiimide group is part of a structure —Ar—N=C=N—Ar— where Ar is a difunctional aromatic substituent, e.g., —$C_6H_4$—$CH_2$—$C_6H_4$—. Aromatic substituents are those having at least one aromatic ring and from six to twenty carbon atoms. Preferred aromatic multi-functional carbodiimides and carbodiimide prepolymers include those derived from isocyanate-terminated prepolymers of diphenyl methane diisocyanate (MDI) and toluene diisocyanate (TDI), preferably those derived from MDI prepolymers, and a polyol. TDI refers to the commercial product sold under this name, which is predominantly the 2,4-isomer, with small amounts of the 2,6-isomer, and possibly other isomers. MDI may be a mixture of 4,4' and 2,4' isomers.

Preferably, the aromatic multi-functional carbodiimide has an average carbodiimide functionality from 1.2 to 10, preferably 1.3 to 6, preferably 1.4 to 5, preferably from 1.5 to 4. Preferably, the aromatic multi-functional carbodiimide is a carbodiimide prepolymer. Preferably, the aromatic multi-functional carbodiimide has a carbodiimide content (i.e., the amount of carbodiimide groups, —N=C=N— in the compound or polymer chain on a solids basis) from 0.5 wt % to 6 wt %, preferably from 1 wt % to 5 wt %, preferably from 2 wt % to 5 wt %.

Preferably, the carbodiimide prepolymer of this invention contains: (i) polymerized residues of an aromatic multi-functional isocyanate and an aliphatic polyol, (ii) carbodiimide groups, and (iii) urethane groups having aliphatic substituents. There may be free aromatic multi-functional isocyanate present in the prepolymer. Preferably, the carbodiimide prepolymer has an average carbodiimide functionality from 1.2 to 10, preferably from 1.8 to 6, preferably from 2 to 5. Preferably, the carbodiimide prepolymer has a carbodiimide content 0.5 wt % to 6 wt %, preferably from 1 wt % to 5 wt %, preferably from 2 wt % to 5 wt %. Preferably, the prepolymer is produced by forming an isocyanate-terminated prepolymer from an aromatic multi-functional isocyanate and an aliphatic polyol, followed by conversion of from 25 to 75% (preferably 30 to 50%, preferably 35 to 45%) of the isocyanate groups to carbodiimide groups using a catalyst, deactivation of the catalyst, and finally, reaction of substantially all of the remaining isocyanate groups with an aliphatic alcohol to form urethane groups having aliphatic substituents. This partial conversion of isocyanate groups to carbodiimide groups lowers the wt % isocyanate in the prepolymer from an initial range of 5 wt % to 17 wt % of isocyanate groups (preferably from 6 wt % to 15.5 wt %) to a final range of 4 wt % to 10 wt % isocyanate (preferably 6 wt % to 9 wt % isocyanate). Preferably all of these steps are performed at temperatures in the range from 25° C. to 110° C., preferably from 40° C. to 100° C., preferably from 50° C. to 95° C. Preferably, the catalyst is a cyclic phosphorous compound, e.g., substituted phospholene-1-oxide, phosphetane 4-oxide or 1,3-diazaphospholidine oxide, preferably 1,3-dimethylphospholine-1-oxide, 1-ethyl-3-methylphospholine-1-oxide, 1-phenyl-3-methylphospholine-1-oxide, 1-phenylphospholene-1-oxide, 1,3,2-diazaphospholidine-2-oxide or 3-methyl-1-phenyl-2-phospholene-1-oxide. Preferably, the catalyst is 3-methyl-phenyl-2-phospholene-1-oxide. Preferably, the catalyst is deactivated by adding a trimethylsilyl compound or a Lewis acid, preferably tris(trimethylsilyl) phosphate or boron trifluoride.

Preferably, the residual isocyanate content of the carbodiimide prepolymer is no greater than 1 wt %, preferably no greater than 0.5 wt %, preferably no greater than 0.3 wt %, preferably no greater than 0.2 wt %. Preferably, the aromatic multi-functional isocyanate used to make the isocyanate-terminated prepolymer has an average isocyanate functionality from 2 to 2.5, preferably from 2 to 2.2. Preferably, the aromatic multi-functional isocyanate is MDI or TDI, preferably MDI. Preferably, the aliphatic polyol is a hydroxy-terminated polyester or polyether polyol, preferably a polyether polyol. Preferably, the aliphatic polyol has an average hydroxyl functionality from 2 to 2.5, preferably from 2 to 2.2, preferably from 2 to 2.1. Preferably, the polyether polyol comprises polymerized residues of ethylene oxide, propylene oxide or a combination thereof. Preferably, the polyether polyol comprises at least 70 wt % polymerized residues of propylene oxide, preferably at least 80 wt %, preferably at least 90 wt %, preferably at least 95 wt %. Preferably, the carbodiimide prepolymer contains from 25 wt % to 55 wt % of polymerized residues of the aliphatic polyol, preferably from 30 wt % to 50 wt %, preferably from 31 wt % to 45 wt %. Preferably, the aliphatic polyol has $M_n$ from 500 to 2500, preferably from 800 to 2200, preferably from 1000 to 2000. More than one isocyanate and/or more than one polyol may be used to make the carbodiimide prepolymer. Preferably, the carbodiimide prepolymer contains from 30 wt % to 60 wt % of polymerized residues of the aromatic multi-functional isocyanate, preferably from 40 wt % to 55 wt %, preferably from 42 wt % to 53 wt %. Preferably, the aliphatic alcohol is a mono-functional alcohol having from one to eight carbon atoms, preferably from one to four carbon atoms. Preferably, the aliphatic alcohol is a linear or branched primary or secondary alcohol; preferably a primary alcohol. Preferred aliphatic alcohols include methanol, ethanol, n-propanol, isopropanol, n-butanol, sec-butanol, isobutanol or tert-butanol; preferably methanol, ethanol, n-propanol or n-butanol; preferably n-butanol. Preferably, the amount of residual aliphatic alcohol in the carbodiimide prepolymer is no greater than 5%, preferably no greater than 3%, preferably no greater than 2%, preferably no greater than 1%, preferably no greater than 0.5%.

Preferably, a carboxylic acid salt used to catalyze curing of the aromatic multi-functional carbodiimide or the carbodiimide prepolymer is a salt of a carboxylic acid having from two to eighteen carbon atoms, preferably from two to eight, preferably from two to four. Salts of mono-carboxylic acids are preferred. Preferably, salts of carboxylic acids are unsubstituted or mono-substituted with halogen or hydroxy groups, preferably unsubstituted. A particularly preferred carboxylate is acetate. Preferably, the cation is an alkali metal; preferably lithium, sodium or potassium; preferably sodium or potassium; preferably potassium. Preferably, the aromatic multi-functional carbodiimide is contacted with the carboxylic acid salt at a temperature from 15° C. to 90° C., preferably from 20° C. to 85° C., preferably from 25° C. to 60° C. Preferably the amount of the carboxylic acid salt as a percentage of the total curable resin composition, on a solids basis, is from 0.01 wt % to 0.5 wt %, preferably from 0.03 wt % to 0.3 wt %, preferably from 0.05 wt % to 0.2 wt %. Preferably, the curable resin composition is substantially free of alkoxides, titanium compounds, copper compounds, organolithium compounds and aluminum halides. As used herein, "substantially free" means having less than 0.5 wt %, preferably less than 0.3 wt %, preferably less than 0.2 wt %, preferably less than 0.1 wt %, preferably less than 0.05 wt %, preferably less than 0.03 wt %, preferably less than 0.02 wt %, preferably less than 0.01 wt %.

In a preferred embodiment of the present invention, the carboxylic acid salt is encapsulated in an inert medium which allows the encapsulated carboxylic acid salt ("catalyst") to be incorporated into the carbodiimide prepolymer or aromatic multi-functional carbodiimide without catalyzing the cure until the encapsulant is removed by mechanical pressure or heat in the laminating process. The encapsulated catalysts typically are produced by deposition of a shell around the catalyst. The catalyst may be contained in one single cavity or reservoir within the capsule or may be in numerous cavities within the capsule. The thickness of the shell may vary considerably depending on the materials used, loading level of catalyst, method of forming the capsule, and intended end-use. Loading levels of catalyst are preferably 5 to 90%, preferably 10-90%, preferably from 30-90%, based on weight of encapsulated catalyst. Certain encapsulation processes lend themselves to higher core volume loading than others. More than one shell may be desirable to ensure premature breakage or leaking.

The encapsulated catalysts can be made by any of a variety of micro-encapsulation techniques including but not limited to coacervation, interfacial addition and condensation, emulsion polymerization, microfluidic polymerization, reverse micelle polymerization, air suspension, centrifugal extrusion, spray drying, prilling, BITEM process, pan coating, and by the M-CAPTM encapsulation process.

Coacervation is a basic process of capsule wall formation. Examples of the coacervation process are listed in U.S. Pat. Nos. 2,800,457 and 2,800,458. The M-CAPTM process is recognized as a preferred method to make 30 micron particle size encapsulated catalysts with high core loading volume (>75%) which can be ruptured with pressure. The M-CAPTM process is described in detail in U.S. Pat. No. 5,271,881. Prilling is also recognized as a preferred method for encapsulation allowing for use of highly crystalline waxes with excellent barrier properties to prevent premature release of the catalyst. Prilling, which is also known as spray congealing, spray chilling or melt atomization provides capsules of sizes between 0.5 µm and 3000 µm with typical loading levels of catalyst of from 5 to 50%. Preferred shell materials for encapsulation via the prilling method include paraffin waxes, synthetic waxes, microcrystalline waxes, vegetable waxes, polyethylene waxes, and low molecular weight polymers. Most preferred shell materials for prilling are paraffin waxes, polyethylene waxes, Fischer-Tropsch waxes with melt points of from 40-120° C. The BITEM process is another suitable example of an encapsulation technique for aqueous solutions of bases. It allows for use of highly crystalline waxes with excellent barrier properties to prevent premature release of the catalyst. This process results in capsules of 50–500 µm in which small chambers containing aqueous catalyst solution are imbedded in a wax matrix. Preferred shell materials for encapsulation via the prilling method include paraffin waxes, synthetic waxes, microcrystalline waxes, vegetable waxes, polyethylene waxes, and low molecular weight polymers. Most preferred shell materials for prilling are paraffin waxes, polyethylene waxes, Fischer-Tropsch waxes with melt points of from 40-120° C. Independent of encapsulation technique the materials used to encapsulate the catalyst may include synthetic waxes, microcrystalline waxes, vegetable waxes, polyethylene waxes, polyamides, polyureas (such as polymethyl urea or PMU), Michael addition polymers (i.e. reaction product of a donor such as acetoacetate or malonate and an acceptor such as a multi-functional acrylate), polyacrylates, side chain crystallizable polyacrylates, polyvinyl alcohol, crosslinked polyvinyl alcohol using crosslinkers such as borates, polydimethyl siloxanes, carboxymethyl cellulose, polystyrene, polyethylene vinyl acetate copolymers, polyethylene acrylate copolymers, polyalpha olefins, polyethylenes, polyethylenes prepared via heterogenous catalysis (e.g. metallocene catalyzed), polypropylene, polypropylenes prepared via heterogenous catalysis (e.g. metallocene catalyzed).

Highly crystalline, sharp melting point materials such as paraffin waxes, synthetic waxes, and polyethylene waxes and highly crystalline, low molecular weight polymers such as side chain crystallizable polyacrylates offer the potential for heat triggered release of the catalyst by judicious selection of the melt point to coincide with the ultimate processing conditions of the composition.

Use of several shells or several separate coatings may be desirable to provide sufficient shell strength and integrity to prevent premature initiation of reaction of the reactants in a one-part formulation containing the encapsulated catalyst. An example of such a multi-shell capsule would be a paraffin or micro-crystalline wax shell (such as accomplished by prilling) followed by a polymethylurea (PMU) shell. Another example would be use of a wax shell followed by a shell prepared by the carbon Michael addition. The preferred particle sizes of the capsules are 0.1 to 1000 µm, more preferably, 0.1 to 500 µm and most preferably 0.1 to 100 µm. The particle size of the capsules may be tailored to the application to ensure rupture under predetermined conditions.

The components of the present system are diluted with solvent prior to coating onto a substrate. As the term is used herein, a solvent is a substance which is liquid at 25° C. and has a boiling point at atmospheric pressure of no more than 100° C. Preferably, the combined components of the system as applied to the substrate contain from 45-75 wt % solids, preferably from 46-60 wt %, preferably from 47-55 wt %, preferably from 48-53 wt %. Suitable solvents include ethyl acetate, methyl acetate and methyl ethyl ketone. Ethyl acetate is especially preferred.

The curable resin composition of the present invention contemplates the employment of two components, which preferably are mixed using a suitable mixer (e.g., an electrically, pneumatically, or an otherwise powered mechanical mixer, or a static mixer) prior to or during application to a substrate to form the bonding agent. Thus, the carbodiimide prepolymer component typically will be packaged separately from the carboxylic acid salt component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. Preferably, the temperature does not exceed 50° C. As desired, heating or cooling may be applied to the resulting laminate. Preferably, a gravure cylinder is used to transfer the mixed adhesive composition to a film, which is then laminated to a second film.

The bonding agent of the present invention is useful for bonding two to five substrates together. The substrates may be similar material or dissimilar material. In a preferred embodiment, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. In a preferred embodiment, the substrate layers are provided in the form of rolls of substrate material. The sheets may be on the order of 0.5 to 10 mil in thickness. Larger thicknesses are also possible, as are smaller thicknesses (e.g., on the order of 5 or more microns).

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Solution viscosities were measured using a Brookfield viscometer operating at a temperature of approximately 25° C. and with fittings appropriate for the viscosity ranges measured. Neat resin viscosities were measured on a Brookfield viscometer using a thermostatted small sample adapter and sample chamber with Spindle #27 at the temperatures indicated. Resins were prepared as described in the following procedures.

Example 1

Carbodiimide Prepolymer Preparation

| Item | Monomer/Intermediate | Charge |
| --- | --- | --- |
| 1 | 4,4'-MDI - Isonate 125M | 301.53 |
| 2 | Voranol 220-110N | 604.54 |
| 3 | Isonate 50 OP | 451.38 |
| 4 | 3-Methyl-phenyl-2-phospholene-1-oxide | 0.3197 |
| 5 | Tris (trimethylsilyl) phosphate | 0.4197 |
| 6 | n-Butanol | 103.86 |
| 7 | n-Butanol | 118.79 |

1. Charge item 1 to vessel at Ambient Temperature (25-30° C.).
2. Heat resin to 65-75° C. under Nitrogen with stiffing.
3. Add Item #2 to resin mixture over a 0.50 Hr. period; Maintain at 75-85° C.
4. Check % NCO. When % NCO≤6.0% proceed to step 5.
5. Start adding Item #3 to resin mixture over a 0.25 Hr. period—Maintain at 75-85° C.
6. Add Item 4; Maintain at 75-85° C. for 1 Hr.; sample resin for % NCO.
7. When % NCO≤9.0% add Item 5 and 6; Maintain at 75-85° C.
8. Add Item 7 to decrease % NCO to ≤0.10%, Monitor % NCO.
9. When % NCO≤0.10% Package under Nitrogen.

Resin properties: 5.99% Carbodiimide, Equivalent Weight 667.78. Viscosity: 323,000 cps at 45° C., 175,750 cps at 45° C.

Example 2

Carbodiimide Prepolymer Preparation

| Item | Monomer/Intermediate | Charge |
| --- | --- | --- |
| 1 | 4,4'-MDI - Isonate 125M | 301.20 |
| 2 | Voranol 220-110N | 601.62 |
| 3 | Isonate OP50 | 302.42 |
| 4 | 3-Methyl-phenyl-2-phospholene-1-oxide | 0.3171 |
| 5 | Tris (trimethylsilyl) phosphate | 0.39 |
| 6 | n-Butanol | 105.29 |
| 7 | n-Butanol | 85.55 |

1. Charge item 1 to vessel at Ambient Temperature (25-30° C.).
2. Heat resin to 65-75° C. under Nitrogen with stiffing.
3. Add Item #2 to resin mixture over a 0.50 Hr. period; Maintain at 75-85° C.
4. Check % NCO. When % NCO≤6.0% proceed to step 5.
5. Start adding Item #3 to resin mixture over a 0.25 Hr. period—Maintain at 75-85° C.
6. Add Item 4; Maintain at 75-85° C. for 1 Hr.; sample resin for % NCO.
7. When % NCO≤9.0% add Item 5 and 6; Maintain at 75-85° C.
8. Add Item 7 to decrease % NCO to ≤0.10%, Monitor % NCO.
9. When % NCO≤0.10% Package under Nitrogen.

Resin properties: 3.71% Carbodiimide, Equivalent weight 1078.2. Viscosity: 132,000 cps at 40° C., 71,750 cps at 45° C., 41,700 cps at 50° C.

Example 3

Carbodiimide Prepolymer Preparation

| Item | Monomer/Intermediate | Charge |
| --- | --- | --- |
| 1 | Isonate 50 OP | 501.40 |
| 2 | Voranol 220-056N | 731.93 |

-continued

| Item | Monomer/Intermediate | Charge |
|------|---------------------|--------|
| 3 | 3-Methyl-phenyl-2-phospholene-1-oxide | 0.1829 |
| 4 | Boron Trifluoride Etherate | 0.6127 |
| 5 | n-Butanol | 55.98 |
| 6 | n-Butanol | 28.57 |
| 7 | n-Butanol | 80.23 |

1. Charge item 1 to vessel at Ambient Temperature (25-30° C.).

2. Heat resin to 65-75° C. under Nitrogen with stiffing.

3. Add Item #2 to resin mixture over a 1.00 Hr. period; Maintain at 75-85° C.

4. Check % NCO. When % NCO≤10.5% proceed to step 5.

5. Start adding Item #3 to resin mixture—Maintain at 75-85° C.

6. Maintain at 80-85° C. for 2 Hrs; sample resin for % NCO.

7. When % NCO≤9.0% add Item 4 and 5; Maintain at 75-85° C.

8. Add Item 6 to decrease % NCO to ≤2.00%, Monitor % NCO.

9. Add Item 7 to decrease % NCO to ≤0.10%.

10. When % NCO≤0.10% Package under Nitrogen.

Resin properties: 1.12% Carbodiimide, Equivalent weight 3571.43. Viscosity: 42,150 cps at 40° C., 25,600 cps at 45° C., 16,100 cps at 50° C.

Example 4

Carbodiimide Prepolymer Preparation

| Item | Monomer/Intermediate | Charge |
|------|---------------------|--------|
| 1 | Isonate 50 OP | 600.40 |
| 2 | Voranol 220-056N | 702.17 |
| 3 | 3-Methyl-phenyl-2-phospholene-1-oxide | 0.2722 |
| 4 | Boron Trifluoride Etherate | 0.4690 |
| 5 | n-Butanol | 50.02 |
| 6 | n-Butanol | 75.86 |
| 7 | n-Butanol | 49.86 |

1. Charge item 1 to vessel at Ambient Temperature (25-30° C.).

2. Heat resin to 65-75° C. under Nitrogen with stiffing.

3. Add Item #2 to resin mixture over a 1.25 Hr. period; Maintain at 75-85° C.

4. Check % NCO. When % NCO≤13.3% proceed to step 5.

5. Start adding Item #3 to resin mixture—Maintain at 75-85° C.

6. Maintain at 80-85° C. for 2 Hrs; sample resin for % NCO.

7. When % NCO≤7.7% add Item 4 and 5; Maintain at 75-85° C.

8. Add Item 6 to decrease % NCO to ≤2.00%, Monitor % NCO.

9. Add Item 7 to decrease % NCO to ≤0.25%.

10. When % NCO≤0.25% Package under Nitrogen.

Resin properties: 2.12% Carbodiimide, Equivalent weight 1886.79. Viscosity: 91,000 cps at 40° C., 53,188 cps at 45° C., 31,900 cps at 50° C.

Example 5

Carbodiimide Prepolymer Preparation

| Item | Monomer/Intermediate | Charge |
|------|---------------------|--------|
| 1 | Isonate 50 OP | 701.89 |
| 2 | Voranol 220-056N | 701.66 |
| 3 | 3-Methyl-phenyl-2-phospholene-1-oxide | 0.2987 |
| 4 | Boron Trifluoride Etherate | 0.2767 |
| 5 | n-Butanol | 50.40 |
| 6 | n-Butanol | 79.93 |
| 7 | n-Butanol | 20.37 |
| 8 | n-Butanol | 34.73 |

1. Charge item 1 to vessel at Ambient Temperature (25-30° C.).

2. Heat resin to 65-75° C. under Nitrogen with stiffing.

3. Add Item #2 to resin mixture over a 1.00 Hr. period; Maintain at 75-85° C.

4. Check % NCO. When % NCO≤14.5% proceed to step 5.

5. Start adding Item #3 to resin mixture—Maintain at 75-85° C.

6. Maintain at 80-85° C. for 2 Hrs; sample resin for % NCO.

7. When % NCO≤6.2% add Item 4 and 5; Maintain at 75-85° C.

8. Add Item 6 to decrease % NCO to ≤2.00%, Monitor % NCO.

9. Add Item 7 and 8 to decrease % NCO to ≤0.0.38%.

10. When % NCO≤0.38% Package under Nitrogen.

Resin properties: 3.08% Carbodiimide, Equivalent weight 1300.81. Viscosity: 135,250 cps at 40° C., 76,125 cps at 45° C., 44,750 cps at 50° C.

Example 6

Carbodiimide Prepolymer Preparation

| Item | Monomer/Intermediate | Charge |
|------|---------------------|--------|
| 1 | Isonate 50 OP | 1002.63 |
| 2 | Voranol 220-110N | 597.39 |
| 3 | 3-Methyl-phenyl-2-phospholene-1-oxide | 0.3324 |
| 4 | Boron Trifluoride Etherate | 0.6630 |
| 5 | n-Butanol | 76.16 |
| 6 | n-Butanol | 77.07 |
| 7 | n-Butanol | 126.29 |
| 8 | n-Butanol | 17.36 |

1. Charge item 1 to vessel at Ambient Temperature (25-30° C.).

2. Heat resin to 65-75° C. under Nitrogen with stiffing.

3. Add Item #2 to resin mixture over a 0.30 Hr. period; Maintain at 75-85° C.

4. Check % NCO. When % NCO≤15.5% proceed to step 5.

5. Start adding Item #3 to resin mixture—Maintain at 75-85° C.

6. Maintain at 80-85° C. for 2 Hrs; sample resin for % NCO.
7. When % NCO≤10.0% add Item 4 and 5; Maintain at 75-85° C.
8. Add Item 6 to decrease % NCO to ≤2.00%, Monitor % NCO.
9. Add Item 7 and 8 to decrease % NCO to ≤0.15%.
10. When % NCO≤0.15% Package under Nitrogen.

Resin properties: 2.07% Carbodiimide, Equivalent weight 1932.37. Viscosity: 1,860,000 cps at 40° C., 933,000 cps at 45° C., 508,600 cps at 50° C.

Example 7

To 10.0 g of Carbodiimide Resin of Example 1 in 10.0 g ethyl acetate solution was mixed with 0.20 g of 3.37% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 1.29/AS | 1.15/AS | 0.72/AS |
| Polypropylene/Polyethylene | 1.38/AS | 1.98/AS Zip | 1.62/AS Zip |
| Polyester/Polyethylene | 2.10/AS | 1.17/AS Zip | 1.00/AS Zip |
| Nylon/Polyethylene | 1.63/AS | 0.70/AS Zip | 0.67/AS Zip |
| Metallized Polyester/Polyethylene | 1.51/AS | 0.55/AS Zip | 0.59/AS Zip |
| Metallized Polypropylene/Polyethylene | 1.40/AS | 1.13/AS | 1.10/AS |
| Metallized Polypropylene/Polypropylene | 0.93/AS | 1.80/AS | 1.44/AS |
| Backed Foil/Nylon | 0.46/AS | 0.21/AS | 0.46/AS |
| Backed Foil/Polyester | 0.34/AS | 0.83/AS | 0.66/AS |

AS: Adhesive Split
Zip: Zippery bond

Example 8

To 10.0 g Carbodiimide Resin of Example 2 in a 10.0 g ethyl acetate solution was mixed with 2.0 g of 0.92% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 2.49/AS | 1.87/AS | 1.15/AS |
| Polypropylene/Polyethylene | 0.70/AS | 1.94/AS | 2.08/AS |
| Polyester/Polyethylene | 0.55/AS | 2.99/AS | 2.93/AS |
| Nylon/Polyethylene | 0.33/AS | 0.21/AS | 0.15/AS |
| Metallized Polyester/Polyethylene | 2.74/AS | 0.79/AS | 0.73/AS |
| Metallized Polypropylene/Polyethylene | 1.39/AS | 0.86/AS | 0.81/AS |
| Metallized Polypropylene/Polypropylene | 0.89/AS | 0.22/AS Zip | 0.23/AS Zip |
| Backed Foil/Nylon | 0.31/AS | 0.69/AS | 0.70/AS |
| Backed Foil/Polyester | 0.27/AS | 1.05/AS | 1.32/AS |

AS: Adhesive Split
Zip: Zippery bond

Example 9

To 10.0 g Carbodiimide Resin of Example 3 in a 10.0 g ethyl acetate solution was mixed with 2.0 g of 0.92% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 0.76/AS | 0.59/AS | 0.42/AS |
| Polypropylene/Polyethylene | 0.78/AS | 0.81/AS | 1.03/AS |
| Polyester/Polyethylene | 0.47/AS | 0.44/AS | 0.43/AS |
| Nylon/Polyethylene | 0.87/AS | 0.80/AS | 0.86/AS |
| Metallized Polyester/Polyethylene | 1.24/AS | 0.94/AS | 0.89/AS |
| Metallized Polypropylene/Polyethylene | 0.07/AS | 0.80/AS | 0.58/AS |
| Metallized Polypropylene/Polypropylene | 0.52/AS | 0.73/AS | 0.47/AS |
| Backed Foil/Nylon | 0.47/AS | 0.59/AS | 0.56/AS |
| Backed Foil/Polyester | 0.32/AS | 0.36/AS | 0.33/AS |

AS: Adhesive Split

Example 10

To 10.0 g Carbodiimide Resin of Example 4 in a 10.0 g ethyl acetate solution was mixed with 2.0 g of 0.92% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 0.12/AS | 0.09/AS | 0.07/AS |
| Polypropylene/Polyethylene | 0.11/AS | 0.10/AS | 0.05/AS |
| Polyester/Polyethylene | 0.11/AS | 0.08/AS | 0.06/AS |
| Nylon/Polyethylene | 0.18/AS | 0.09/AS | 0.06/AS |
| Metallized Polyester/Polyethylene | 0.11/AS | 0.08/AS | 0.09/AS |
| Metallized Polypropylene/Polyethylene | 0.12/AS | 0.07/AS | 0.04/AS |
| Metallized Polypropylene/Polypropylene | 0.08/AS | 0.04/AS | 0.06/AS |
| Backed Foil/Nylon | 0.04/AS | 0.03/AS | 0.02/AS |
| Backed Foil/Polyester | 0.08/AS | 0.02/AS | 0.04/AS |

AS: Adhesive Split

Example 11

To 10.0 g Carbodiimide Resin of Example 5 in a 10.0 g ethyl acetate solution was mixed with 2.0 g of 0.92% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 1.16/AS | 0.96/AS | 1.20/AS |
| Polypropylene/Polyethylene | 2.11/AS | 1.78/AS | 1.72/AS |
| Polyester/Polyethylene | 1.91/AS | 1.78/AS | 1.82/AS |
| Nylon/Polyethylene | 2.53/AS | 2.10/AS | 2.27/AS |
| Metallized Polyester/Polyethylene | 1.80/AS | 2.11/AS | 2.05/AS |
| Metallized Polypropylene/Polyethylene | 2.63/AS | 2.11/AS | 2.29/AS |
| Metallized Polypropylene/Polypropylene | 2.06/AS | 2.32/AS | 2.24/AS |
| Backed Foil/Nylon | 1.25/AS | 1.23/AS | 1.41/AS |
| Backed Foil/Polyester | 1.05/AS | 1.05/AS | 1.16/AS |

AS: Adhesive Split

Example 12

To 10.0 g Carbodiimide Resin of Example 6 in a 10.0 g ethyl acetate solution was mixed with 2.0 g of 0.92% potassium acetate in ethanol and coated to yield a coating weight of 1.0 lbs/rm (1.628 g/m$^2$). The laminates were cured at ambient conditions. The bond strength was examined as a function of curing time and is reported below.

| Laminate Structure | Bond Strength (N/15 mm) | | |
|---|---|---|---|
| | 7 Day | 14 Days | 21 Days |
| Polypropylene/Polypropylene | 0.53/AS | 0.54/AS | 1.01/AS |
| Polypropylene/Polyethylene | 2.46/AS | 2.18/AS | 2.84/AS |
| Polyester/Polyethylene | 3.19/AS | 1.34/AS | 0.81/AS |
| Nylon/Polyethylene | 2.08/AS | 0.94/AS | 1.18/AS |
| Metallized Polyester/Polyethylene | 4.16/AS | 1.20/AS | 1.19/AS |
| Metallized Polypropylene/Polyethylene | 2.74/AS | 0.95/AS | 0.82/AS |
| Metallized Polypropylene/Polypropylene | 2.46/AS | 0.47/AS | 0.85/AS |
| Backed Foil/Nylon | 1.22/AS | 1.04/AS | 1.02/AS |
| Backed Foil/Polyester | 1.19/AS | 1.35/AS | 1.72/AS |

AS: Adhesive Split

The invention claimed is:

1. A method for polymerizing an aromatic multi-functional carbodiimide; said method comprising contacting the aromatic multi-functional carbodiimide with a carboxylic acid salt at a temperature from 15° C. to 90° C.; wherein the aromatic multi-functional carbodiimide is a carbodiimide prepolymer having an average carbodiimide functionality from 1.3 to 6; the carbodiimide prepolymer contains: (i) polymerized residues of diphenyl methane diisocyanate and from 31 to 45 wt % of an aliphatic polyol, (ii) carbodiimide groups, and (iii) urethane groups having aliphatic substituents; and the carbodiimide prepolymer has a carbodiimide content from 2 to 5 wt %.

2. A curable resin composition comprising a carbodiimide prepolymer and a carboxylic acid salt; wherein the carbodiimide prepolymer has two aromatic substituents adjacent to each carbodiimide group; wherein the carbodiimide prepolymer has an average carbodiimide functionality from 1.3 to 6; the carbodiimide prepolymer contains: (i) polymerized residues of diphenyl methane diisocyanate and from 31 to 45 wt % of an aliphatic polyol, (ii) carbodiimide groups, and (iii) urethane groups having aliphatic substituents; the carbodiimide prepolymer has a carbodiimide content from 2 to 5 wt % and a residual isocyanate content no greater than 1 wt %; and the amount of the carboxylic acid salt as a percentage of total curable resin composition, on a solids basis, is from 0.03 wt % to 0.3 wt %.

3. The method of claim 1 in which the aromatic multi-functional carbodiimide is contacted with a carboxylic acid salt at a temperature from 20° C. to 85° C.

* * * * *